United States Patent Office 2,793,975
Patented May 28, 1957

2,793,975
SUBSTITUTED EPOXY AND EPITHIA DIMETHANONAPHTHALENES

Victor Mark, Evanston, Ill., assignor to Universal Oil Products Company, Des Plaines, Ill., a corporation of Delaware No Drawing. Application June 16, 1954, Serial No. 437,282

16 Claims. (Cl. 167—33)

This invention relates to saturated polycyclic organic compounds containing various substituents on the nuclear structure, said compounds being useful as chemical intermediates and as the toxicant ingredient of pesticidal compositions.

More specifically this invention relates to tetracyclic organic compositions formed by a process which involves the condensation of a substituted bicyclic olefinic compound with a cyclic alkadiene followed by epoxidation of the resulting tetracyclic compounds.

This invention provides a series of compounds characterized generally as polycyclic compounds and more particularly as tetracyclic compounds which may be substituted on multiple nuclear positions by halogen, alkyl, haloalkyl, nitro, cyano, nitroso, thiocyano, epoxy, epithia, etc. radicals, and which may also contain halogen or other substituents on aliphatic side chains attached to the carbocyclic nucleus comprising the initial structure of the product. These compounds are the products of a Diels-Alder type condensation reaction of a cycloalkadiene with a substituted bicyclic olefinic compound.

An object of this invention is to provide polysubstituted saturated polycyclic compounds which are useful as insecticides.

A further object of this invention is to provide halogen substituted tetracyclic compounds which may or may not contain nuclearly substituted side chains, said compounds being useful as a means of controlling pestiologically active organisms.

In one embodiment the present invention concerns a process for preparing a saturated tetracyclic compound by reacting an unsaturated tetracyclic compound with an epoxidizing agent, and recovering the resultant epoxy-substituted saturated tetracyclic compound, said tetracyclic compound having the general formula:

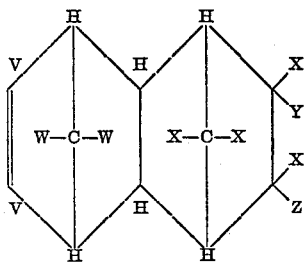

in which V is selected from the group consisting of a hydrogen, halogen and alkyl, W and X are selected independently from the group consisting of hydrogen and halogen radicals, Y is selected from the group consisting of halogen, alkyl and haloalkyl radicals, and Z is selected from the group consisting of nitro, nitroso, cyano, thiocyano and halogen.

Another embodiment of this invention resides in a method of controlling pestiologically active organisms by treating said organisms with a compound having the general formula:

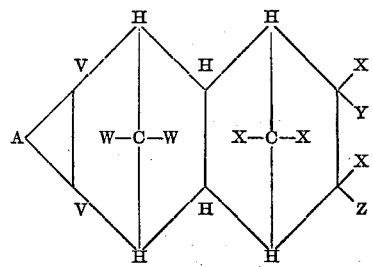

in which A is selected from the group consisting of oxygen and sulfur, V is selected from the group consisting of hydrogen, halogen and alkyl, W and X are independently selected from the group consisting of hydrogen and halogen, Y is selected from the group consisting of halogen, alkyl and haloalkyl, and Z is selected from the group consisting of nitro, nitroso, cyano, thiocyano and halogen.

A specific embodiment of this invention resides in a process for preparing a saturated tetracyclic compound by reacting 6-nitro-7-trichloromethyl-1,4,4a,5,6,7,8,8a,-octahydro-1,4,5,8-dimethanonaphthalene with perbenzoic acid, and recovering the resultant 2,3-epoxy-6-nitro-7-trichloromethyl - 1,2,3,4,4a,5,6,7,8,8a-decahydro-1,4,5,8-dimethanonaphthalene.

Another specific embodiment of this invention resides in a method of controlling pestiologically active organisms by treating said organisms with a compound comprising 2,3-epoxy-6-nitro-7-trichloromethyl-1,2,3,4,4a,5,6,7,8,8a-decahydro-1,4,5,8-dimethanonaphthalene.

Still another specific embodiment of this invention resides in a new composition of matter comprising 2,3-epoxy - 6-nitro-7-trichloromethyl-1,2,3,4,4a,5,6,7,8,8a-decahydro-1,4,5,8-dimethanonaphthalene.

Other objects and embodiments relating to alternative tetracyclic compounds will be referred to in the following further detailed description of the invention.

As hereinbefore indicated, the products of this invention are formed by reacting an unsaturated tetracyclic compound having the general formula:

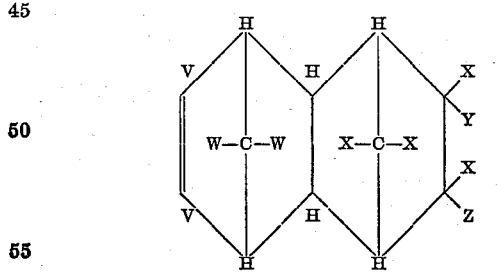

said V, W, X and Z being substituents of the reactant hereinbefore designated, with an epoxidizing agent whereby the olefinic linkage is saturated and contains an oxygen substituent. These unsaturated tetracyclic compounds may be prepared by reacting a cyclic alkadiene having a structure corresponding to the following general formula:

in which V is selected from the group consisting of hydrogen, halogen or alkyl radicals and W is selected from the group consisting of hydrogen and halogen radicals, with a bicyclic olefin having a structure corresponding to the general formula:

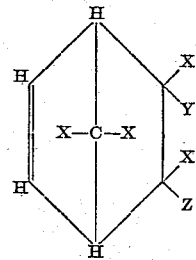

in which X may comprise hydrogen or halogen radicals, Y may consist of halogen, alkyl or haloalkyl radicals and Z may consist of nitro, nitroso, cyano, thiocyano or halogen radicals.

Examples of cyclic alkadienes having the aforementioned structure required for yielding the intermediate product of the present invention include cyclopentadiene; alkyl substituted cyclopentadienes such as 2-methylcyclopentadiene, 2-ethylcyclopentadiene, 2-propylcyclopentadiene, 2,3-dimethylcyclopentadiene, 2,3-diethylcyclopentadiene, etc.; halogen substituted cyclopentadienes such as 2 - chlorocyclopentadiene, 2 - bromocyclopentadiene, 2-fluorocyclopentadiene, 2,3-dichlorocyclopentadiene, 2,3-dibromocyclopentadiene, 2,3-difluorocyclopentadiene, 5,5-dichlorocyclopentadiene, 5,5 - difluorocyclopentadiene, 2,5,5 - trichlorocyclopentadiene, 2,3,5,5 - tetrachlorocyclopentadiene, 2,3,5,5-tetrafluorocyclopentadiene, etc., 2,3-dichloro-5,5-difluorocyclopentadiene, 2-chloro-5,5-difluorocyclopentadiene, etc.

Substituted bicyclic compounds capable of reacting with the cyclic alkadiene reactant to form unsaturated tetracyclic compounds according to the present invention include 5 - nitro - 6 - trichloromethylbicyclo[2.2.1]-2-heptene, 5-nitro-5,6,6-trichlorobicyclo[2.2.1]-2-heptene, 5 - nitro - 6 - $\alpha,\alpha,\beta$ - trichloropropylbicyclo[2.2.1] - 2-heptene, 5,5,6-trichloro-6-trifluoromethylbicyclo[2.2.1]-2-heptene, 5-thiocyano-6-trichloromethylbicyclo[2.2.1]-2-heptene, 5-nitro-5,7,7-trichloro-6-trichloromethylbicyclo-[2.2.1]-2-heptene, etc.

It is understood that the above mentioned cyclic alkadienes and substituted bicyclic olefins are only representative of the class of compounds which may be used in the process of the present invention and that said process is not necessarily limited thereto.

The volatility of the present product is usually dependent upon its molecular weight and when a product having low volatility is especially desired in a particular application, such as a high degree of retentivity or activity on the surface to which the pesticide is applied, advantage may be taken of the fact that the products of the present invention having a high molecular weight also possess relatively higher boiling points than do the products having low molecular weights and, thus, may be the preferred reactants for the production of such compositions. The present unsaturated tetracyclic nuclearly substituted compounds are prepared by the thermal condensation of the reactant hereinbefore characterized as a cyclic alkadiene with the reactant referred to as the substituted bicyclic olefin, preferably at a pressure sufficient to maintain at least one of the reactants in substantially liquid phase. Although the use of approximately equimolecular ratios of the reactant generally results in a sufficient yield of the desired condensation product, it is usually preferred to maintain a stoichiometric excess of the bicyclic alkene in the reaction mixture of from about 1.5 to 1 to about 10 to 1 molecules per mole of the cyclic alkadiene reactant in order to consume the latter component substantially to completion during the reaction. In addition, the excess of the bicyclic olefin reactant provides an effective diluent of the reaction mixture enabling the rate of the resultant exothermic reaction to be controlled within desirable limits. In thus substantially removing the cyclic alkadiene component from the reaction mixture by virtue of its substantially complete condensation with the bicyclic olefin, the subsequent problem of separating products from the reaction mixture is simplified considerably since the excess of bicyclic olefin, usually the component of the reaction mixture having the lowest boiling point, may be removed therefrom merely by distilling the same from the mixture, leaving a residue comprising the desired insecticidal condensation product. The latter residue may be thereafter purified, for example, by fractional distillation, crystallization, extraction, or by any other means well known in the art, or utilized directly without further treatment for the preparation of still another insecticidal composition. The products may be additionally treated, for example, by reaction with a metal to effect dehalogenation or with an alkaline material to effect dehydrohalogenation. In addition, the compounds may also be halogenated, if so desired, to introduce additional halogen substituents into the structure.

The condensation reaction provided herein, generally characterized as one of the Diels-Alder type, is effected at a temperature of from about 30° to about 180° C. or higher, preferably at a temperature of from about 50° C. to about 150° C. Use of superatmospheric pressures, generally in excess of about 2 atmospheres and preferably from about 10 to about 100 atmospheres is advantageous in providing an essentially liquid phase reaction mixture. In order to provide such pressure within the reaction vessel, a gas such as nitrogen, carbon dioxide, or other gases may be charged to the reaction vessel at the desired pressure and the reaction mixture heated at such pressure until the optimum degree of condensation has occurred.

The unsaturated tetracyclic nuclearly substituted condensation products, examples of which include 6-nitro-7-chloromethyl - 1,4,4a,5,6,7,8a - octahydro a 1,4,5,8 - dimethanonaphthalene, 6 - nitro - 7 - dichloromethyl 1,4, 4a,5,6,7,8,8a - octahydro - 1,4,5,8 - dimethanonaphthalene, 6 - nitro - 7 - trichloromethyl - 1,4,4a,5,6,7,8,8a-octahydro - 1,4,5,8 - dimethanonaphthalene, 6 - cyano-7 - trichloromethyl - 1,4,4a,5,6,7,8,8a - octahydro - 1,4, 5,8 - dimethanonaphthalene, 6 - nitroso - 7 - trichloromethyl - 1,4,4a,5,6,7,8,8a - octahydro - 1,4,5,8 - dimethanonaphthalene, 6 - nitro - 7 - $\alpha,\alpha,\beta$ - trichloropropyl-1,4,4a,5,6,7,8,8a - octahydro - 1,4,5,8 - dimethanonaphthalene, 6 - cyano - 7 - $\alpha,\alpha,\beta$ - trichloropropyl - 1,4,4a,-5,6,7,8,8a - octahydro - 1,4,5,8 - dimethanonaphthalene, 6 - nitro - 6 - methyl - 7 - trichloromethyl - 1,4,4a,5,6,7, 8,8a - octahydro - 1,4,5,8 - dimethanonaphthalene, 6,6, 7 - trichloro - 7 - trifluoromethyl - 1,4,4a,5,6,7,8,8a - octahydro - 1,4,5,8 - dimethanonaphthalene, 6 - cyano - 6-chloro - 7 - trifluoromethyl - 1,4,4a,5,6,7,8,8a - octahydro - 1,4,5,8 - dimethanonaphthalene, 6 - cyano - 6,10, 10 - trichloro - 7 - trifluoromethyl - 1,4,4a,5,6,7,8,8a-octahydro - 1,4,5,8 - dimethanonaphthalene, etc., are then subjected to the action of an epoxidizing agent to form the desired pestiologically active compositions.

The epoxidation of the unsaturated tetracyclic compounds occurs at temperatures of 35° C. or below, in the presence of an inert organic solvent such as chloroform, carbon tetrachloride, methanol, etc. Due to the fact that the reaction may be exothermic by nature, the temperature of said reaction is desirably maintained below the above mentioned maximum, although in the case of the less reactive compounds within the class provided herein such as certain highly substituted compounds, the temperature may be increased somewhat above the indicated preferred maximum in order to promote the rate of reaction. The preferred epoxidizing agents utilizable in this reaction comprise organic peracids such as perbenzoic acid, peracetic acid, monoperthalic acid, performic acid, etc. Inorganic oxidizing agents such as nitric acid, potassium permanganate, potassium dichromate, etc. may also be used, although not necessarily with equivalent results. Alternatively, the epoxide may be formed by addition of hypochlorous acid at the 2,3 double bond, and subsequent dehydrohalogenation.

The epoxidation of the aforementioned unsaturated tetracyclic compounds results in a new composition of matter comprising saturated epoxy compounds such as 2,3-epoxy-6-nitro-7-mono-, di-, or trichloromethyl-1,2,3,4,4a,5,6,7,8,8a - decahydro - 1,4,5,8 - dimethanonaphthalenes, 2,3 - epoxy - 6 - cyano - 7 - trichloromethyl-1,2,3,4,4a,5,6,7,8,8a - decahydro - 1,4,5,8 - dimethanonaphthalene, 2,3 - epoxy - 6 - nitroso - 7 - trichloromethyl - 1,2,3,4,4a,5,6,7,8,8a - decahydro - 1,4,5,8 - dimethanonaphthalene, 2,3 - epoxy - 6 - nitro - 7 - $\alpha,\alpha,\beta$ - trichloropropyl - 1,2,3,4,4a,5,6,7,8,8a - decahydro - 1,4,5,8 - dimethanonaphthalene, 2,3 - epoxy - 6 - cyano - 7 - $\alpha,\alpha,\beta$ - trichloropropyl - 1,2,3,4,4a,5,6,7,8,8a - decahydro-1,4,5,8 - dimethanonaphthalene, 2,3 - epoxy - 6 - nitro-6 - methyl - 7 - trichloromethyl - 1,2,3,4,4a,5,6,7,8,8a-decahydro-1,4,5,8 - dimethanonaphthalene, 2,3 - epoxy-6,6,7 - trichloro - 7 - trifluoromethyl - 1,2,3,4,4a,5,6,7,8,8a - decahydro - 1,4,5,8 - dimethanonaphthalene, 2,3-exopy - 6 - cyano - 6 - chloro - 7 - trifluoromethyl - 1,2,3,4,4a,5,6,7,8,8a - decahydro - 1,4,5,8 - dimethanonaphthalene, 2,3 - epoxy - 6 - cyano - 6,10,10 - trichloro - 7- trifluoromethyl - 1,2,3,4,4a,5,6,7,8,8a - decahydro - 1,4,5,8 - dimethanonaphthalene, etc., constituting the desired end products of the present process to which the invention is directed.

If so desired, the epoxy-substituted tetracyclic compounds may undergo further reaction with a sulfur-containing compound to convert said epoxy-substituted compounds to epithia substituted compounds. For example, the aforementioned epoxy compounds can be reacted with potassium thiocyanate, or other sulfur-containing compounds such as a mercaptan, to produce the corresponding thia-analog of the epoxy-substituted product, such as, for example, 2,3 - epithia - 6 - nitro - 7 - trichloromethyl decahydro - 1,4,5,8 - dimethanonaphthalene, 2,3 - epithia - 6 - cyano - 7 - trichloromethyl - decahydro - 1,4,5,8 - dimethanonaphthalene, 2,3 - epithia-6 - nitro - 7 - $\alpha,\alpha,\beta$ - trichloropropyl decahydro - 1,4,5, 8 - dimethanonaphthalene, etc. which are also new compositions of matter.

The process of the present invention may be effected in any suitable manner and may comprise either a batch or continuous type operation. When a batch type operation is used, a quantity of the reactants, namely, the cycloalkadiene and the substituted bicyclic olefin are placed in an appropriate condensation apparatus containing mixing and heating means. The reaction vessel is heated to the desired temperature and maintained at such temperature for a predetermined period of time, generally for a period in excess of 0.5 hour and up to about 24 hours. At the end of this time the product is separated by conventional means such as fractional distillation, crystallization, etc. The unsaturated tetracyclic compound may then be returned to the same reaction vessel, or to a second vessel, along with the epoxidizing agent such as perbenzoic acid. This reaction vessel is then maintained at the desired temperature for a second predetermined time ranging from about 3 hours to about 100 hours. At the end of this time the epoxy-substituted saturated tetracyclic compound is separated from unreacted starting materials by washing with mild alkali, water, drying and fractional distillation or recrystallization from an inert organic solvent. If the thia-substituted analog is desired as the ultimate product, the epoxy derivative formed as hereinbefore indicated is thereafter reacted with a sulfur-containing compound such as potassium thiocyanate in still a third reaction vessel for the necessary time, and thereafter separated from the unreacted epoxy compound by suitable means, for example, by fractional distillation, crystallization, etc.

The products of this invention may also be prepared by a continuous process wherein the reactants are continually charged into a reaction vessel maintained at the proper operating conditions of temperature and pressure while the reaction product is continuously withdrawn after the desired residence time in the reactor. This reaction product comprising the unsaturated tetracyclic compound is then continuously charged to a second reactor and subjected to the action of an epoxidizing agent at reduced temperature, said epoxidizing agent also being continuously charged to the reactor. The epoxy-substituted compound is withdrawn from the second reactor after a suitable period of residence time and purified, while the unreacted material may be recycled for further use as a portion of the feed stock. If a thia-substituted derivative is desired, the epoxy-substituted compound is continuously charged to a third reactor where it is reacted with a sulfur-containing compound, withdrawn after the necessary residence time and separated from unreacted materials.

The physical properties of the present tetracyclic condensation products and the effects they have on entomological forms of life make them particularly desirable as insecticides and insect repellants, the compounds having many of the features desired of materials for this purpose. They are, for example, toxic to insects which are destructive of plant life and materials normally subject to insect infestation, their toxic effects being manifested by contact of the poison with the insect. The insecticides comprising the present compounds are thus effective against chewing as well as sucking types of insects. The compounds are sufficiently volatile so that when applied to plant life intended for subsequent human consumption, the plants when harvested and after allowing a reasonable time for evaporation of the applied insecticide therefrom retain none of the toxicant to prevent use of the plant for consumption as food. On the other hand, the compounds are of sufficiently limited volatility to be retained for the time required to accomplish the toxic effects of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, etc.; a wax, such as paraffin wax, beeswax, etc.; a high molecular weight alcohol or ether such as myricyl alcohol, dibutyl ether, etc. or they may be emulsified with water or combined with an oil and emulsified with water by the addition of an emulsifying agent such as a surface active agent, to the mixture of components. The latter solvents and dispersants may also be employed for the specific purpose of reducing the concentration of insecticide to the desired level in a specific insecticide formulation. The particular formulation of active components in combination with the solvent or dispersant will depend upon its application. Compositions containing as high as 20% of active component may be preferred in some instances where deep penetration of the insecticide is desired, as in the treatment of fibrous material, such as wood for extinction of a particular infestation, such as wood termites. For other purposes, the required concentration of active components in the formulation may be as low as 0.1%, as for example in the treatment of fabrics for destroying moth larvae. In utilizing the present insecticidal compounds against most insects a composition containing from about 0.1% to about 5% by weight of the active component is highly effective. The choice of the most desirable solvent or dispersant further depends upon the method utilized to apply the insecticidal composition to the infested article. For example, a low molecular weight, normally gaseous carrying agent for the active insecticidal component, such as butane, the Freons, etc., may be compressed and liquefied into a small bomb containing the insecticide. Upon release of pressure from the bomb, the liquefied carrier vaporizes and suspends a quantity of the active component therein, thus providing a convenient spraying method of applying the insecticide. The active component may also be dissolved in a liquid carrier, such as kerosene, an alcohol, etc. and the resulting solution atomized by a suitable spraying device.

The present invention is further illustrated with respect to specific embodiments therein the following examples which, however, are not intended to limit the generally broad scope of the present invention in strict accordance therewith.

EXAMPLE I

Equimolar portions of cyclopentadiene and 5-nitro-6-trichloromethylbicyclo[2.2.1]-2-heptene in a solvent comprising n-pentane were placed in a tube which was thereafter sealed and heated to a temperature of approximately 160° C. for a period of 7 hours. At the end of this time, the tube and contents thereof were cooled to room temperature, broken, and the reaction product therein subjected to fractional distillation under reduced pressure. The fraction having a melting point of 43–44° C., consisting of 6-nitro-7-trichloromethyl-1,4,4a,5,6,7,8,8a-octahydro - 1,4,5,8 - dimethanonaphthalene, was separated from the reaction mixture.

6.5 g. of the aforementioned reaction product cut was placed in a second reaction vessel along with 54 ml. of a chloroform solution containing 2.9 g. of perbenzoic acid, the temperature of the mixture rising somewhat upon mixing the reactants. The temperature of the reactor was maintained at room temperature by outside means for a period of 72 hours. At the end of this time the chloroform solution was washed twice with dilute potassium carbonate solution, twice with water, and dried over calcium chloride. The solution was filtered, the chloroform evaporated on a steam bath and the residue remaining after the evaporation was recrystallized from methanol. The fraction, having a melting point of 82°–83° C., and comprising 2,3-epoxy-6-nitro-7-trichloromethyl-1,2,3,4a,5,6,7,8,8a-decahydro - 1,4,5,8 - dimethanonaphthalene was separated therefrom.

EXAMPLE II

Equimolar portions of 5,6,6-trichloro-6-trifluoromethylbicyclo[2.2.1]-2-heptene and cyclopentadiene are dissolved in a solvent comprising n-pentane. The mixture is then sealed in a tube and heated to a temperature of approximately 160° C. for 7 hours. At the end of this time the tube and the contents thereof are cooled to room temperature, broken and the contents thereof subjected to fractional distillation under reduced pressure. The cut consisting of 6,7,7-trichloro-7-trifluoro-methyl-1,4,4a,5,6,7,8,8a,-octahydro - 1,4,5,8 - dimethanonaphthalene is separated therefrom.

The reaction product described in the preceding paragraph is mixed with a chloroform solution containing perbenzoic acid at room temperature for a period of approximately 68 hours. At the end of this time, the chloroform solution is washed with dilute potassium carbonate, twice with water, and dried over calcium chloride. The solution is filtered and the filtrate is evaporated on a steam bath to drive off the chloroform contained therein. The residue is recrystallized from methanol and comprises 2,3-epoxy-6,7,7-trichloro-7-trifluoromethyl-1,2,3,4,4a,5,6,7,8,8a-decahydro-1,4,5,8-dimethanonaphthalene.

EXAMPLE III

The product obtained from the reaction described in Example I, namely, 2,3-epoxy-6-nitro-7-trichloromethyl-1,2,3,4,4a,5,6,7,8,8a-decahydro-1,4,5,8-dimethanonaphthalene is reacted with potassium thiocyanate and the product therefrom, comprising 2,3-epithia-6-nitro-7-trichloromethyl - 1,2,3,4,4a,5,6,7,8,8a-decahydro - 1,4,5,8 - dimethanonaphthalene, is separated from unreacted materials.

EXAMPLE IV 2,3-epoxy-6-nitro-7-trichloromethyl - 1,2,3,4,4a,5,6,7,8,8a-decahydro-1,4,5,8-dimethanonaphthalene was tested to show the insecticidal properties thereof. The results of these tests using houseflies, southern army worms, adult pea aphids and mites as test insects are set forth in Table I below.

Table I.—Pesticide: 2,3-epoxy-6-nitro-7-trichloromethyl-1,2,3,4,4a,5,6,7,8,8a - decahydro - 1,4,5,8 - dimethanonaphthalene

| | 1% dil. | 0.1% dil. |
|---|---|---|
| Houseflies percent dead, 24 hrs | 100 | 100 |
| Southern army worm percent dead, 24 hrs | 100 | 20 |
| Adult pea aphid percent dead, 24 hrs | 100 | 30 |
| Mites percent dead, 24 hrs | 70 | 55 |

I claim as my invention:

1. A process which comprises epoxidizing 6-nitro-7-trichloromethyl - 1,4,4a,5,6,7,8,8a-octahydro - 1,4,5,8-dimethanonaphthalene with perbenzoic acid, and recovering the resultant 2,3-epoxy-6-nitro-7-trichloromethyl-1,2,3,4,4a,5,6,7,8,8a-decahydro-1,4,5,8-dimethanophthalene.

2. A process which comprises epoxidizing 6-cyano-7-trichloromethyl - 1,4,4a,5,6,7,8,8a - octahydro - 1,4,5,8-dimethanonaphthalene with perbenzoic acid, and recovering the resultant 2,3-epoxy-6-cyano-7-trichloromethyl-1,2,3,4,4a,5,6,7,8,8a-decahydro-1,4,5,8 - dimethanonaphthalene.

3. A process which comprises epoxidizing 6,6,7-trichloro-7-trifluoromethyl - 1,4,4a,5,6,7,8,8a - octahydro-1,4,5,8-dimethanonaphthalene with perbenzoic acid, and recovering the resultant 2,3-epoxy-6,6,7-trichloro-7-trifluoromethyl - 1,2,3,4,4a,5,6,7,8,8a - decahydro - 1,4,5,8-dimethanonaphthalene.

4. A process which comprises epoxidizing 6-nitro-7-$\alpha,\alpha,\beta$ - trichloropropyl-1,4,4a, 5, 6, 7, 8, 8a-decahydro-1,4,5,8-dimethanonaphthalene with perbenzoic acid, and recovering the resultant 2,3-epoxy-6-nitro-7-$\alpha,\alpha,\beta$-trichloropropyl - 1,2,3,4,4a,5,6,7,8,8a - decahydro - 1,4,5,8-dimethanonaphthalene.

5. 2,3-epoxy-6-nitro-7-trichloromethyl - 1,2,3,4,4a,5,6,7,8,8a,-decahydro-1,4,5,8-dimethanonaphthalene.

6. 2,3-epoxy-6-cyano - 7 - trichloromethyl-1,2,3,4,4a,5,6,7,8,8a-decahydro-1,4,5,8-dimethanonaphthalene.

7. 2,3-epoxy-6,6,7-trichloro - 7 - trifluoromethyl-1,2,3,4,4a,5,6,7,8,8a-decahydro-1,4,5,8-dimethanonaphthalene.

8. 2,3-epoxy-6-nitro - 7 - $\alpha,\alpha,\beta$-trichloropropyl-1,2,3,4,4a,5,6,7,8,8a-decahydro-1,4,5,8-dimethanonaphthalene.

9. 2,3 - epithia-6-nitro - 7 - trichloromethyl-1,2,3,4,4a,5,6,7,8,8a-decahydro-1,4,5,8-dimethanonaphthalene.

10. A new insecticidal composition comprising 2,3,-epoxy-6-nitro - 7 - trichloromethyl - 1,2,3,4,4a,5,6,7,8,8a-decahydro-1,4,5,8-dimethanonaphthalene and a liquid carrier therefor.

11. A compound selected from the group consisting of 2,3-epoxy - 6 - nitro - 7 - mono-, di-, and trichloromethyl-1,2,3,4,4a,5,6,7,8,8a-decahydro - 1,4,5,8 - dimethanonaphthalenes, 2,3-epoxy-6-cyano-7-trichloromethyl - 1,2,3,4,4a, 5,6,7,8,8a-decahydro-1,4,5,8-dimethanonaphthalene, 2,3,-epoxy-6-nitroso - 7 - trichloromethyl-1,2,3,4,4a,5,6,7,8,8a-decahydro - 1,4,5,8 - dimethanonaphthalene, 2,3-epoxy-6-nitro - 7 - $\alpha,\alpha,\beta$-trichloropropyl-1,2,3,4,4a,5,6,7,8,8a-decahydro - 1,4,5,8-dimethanonaphthalene, 2,3-epoxy-6-cyano-7 - $\alpha,\alpha,\beta$ - trichloropropyl-1,2,3,4,4a,5,6,7,8,8a-decahydro-1,4,5,8-dimethanonaphthalene, 2,3-epoxy-6-nitro-6-methyl - 7 - trichloromethyl - 1,2,3,4,4a,5,6,7,8,8a-decahydro-1,4,5,8-dimethanonaphthalene, 2,3-epoxy-6,6,7-trichloro-7 - trifluoromethyl-1,2,3,4,4a,5,6,7,8,8a-decahydro-1,4,5,8-dimethanonaphthalene, 2,3-epoxy-6-cyano-6-chloro-7-trifluoromethyl - 1,2,3,4,4a,5,6,7,8,8a - decahydro - 1,4,5,8-dimethanonaphthalene, 2,3-epoxy - 6 - cyano-6,10,10-trichloro-7-trifluoromethyl-1,2,3,4,4a,5,6,7,8,8a - decahydro-1,4,5,8-dimethanonaphthalene, 2,3-epithia - 6 - nitro-7-trichloromethyl decahydro - 1,4,5,8 - dimethanonaphthalene, 2,3-epithia-6-cyano-7-trichloromethyl-decahydro - 1,4,5,8-dimethanonaphthalene, and 2,3-epithia-6-nitro-7-α,α,β-trichloropropyl decahydro-1,4,5,8-dimethanonaphthalene.

12. An insecticidal composition comprising the compound of claim 11 and a liquid carrier therefor.

13. A process which comprises epoxidizing a compound selected from the group consisting of 6-nitro-7-chloromethyl-1,4,4a,5,6,7,8,8a-octahydro - 1,4,5,8 - dimethanonaphthalene, 6-nitro-7-dichloromethyl - 1,4,4a,5,6,7,8,8a-octahydro - 1,4,5,8 - dimethanonaphthalene, 6-nitro-7-trichloromethyl - 1,4,4a,5,6,7,8,8a - octahydro - 1,4,5,8 - dimethanonaphthalene, 6-cyano-7-trichloromethyl-1,4,4a,5,6,7,8,8a-octahydro - 1,4,5,8 - dimethanonaphthalene, 6-nitroso - 7 - trichloromethyl - 1,4,4a,5,6,7,8,8a - octahydro-1,4,5,8 - dimethanonaphthalene, 6-nitro-7-α,α,β-trichloropropyl-1,4,4a,5,6,7,8,8a-octahydro-1,4,5,8-dimethanonaphthalene, 6-cyano-7-α,α,β-trichloropropyl-1,4,4a,5,6,7,8,8a-octahydro-1,4,5,8-dimethanonaphthalene, 6-nitro-6-methyl-7-trichloromethyl-1,4,4a,5,6,7,8,8a - octahydro-1,4,5,8-dimethanonaphthalene, 6,6,7-trichloro-7-trifluoromethyl-1,4,4a,5,6,7,8,8a-octahydro-1,4,5,8-dimethanonaphthalene, 6 - cyano - 6 - chloro-7-trifluoromethyl-1,4,4a,5,6,7,8,8a-octahydro-1,4,5,8-dimethanonaphthalene, and 6-cyano-6,10,10-trichloro - 7 - trifluoromethyl-1,4,4a,5,6,7,8,8a-octahydro-1,4,5,8-dimethanonaphthalene.

14. The process of claim 13 further characterized in that said compound is epoxidized by reaction with perbenzoic acid.

15. The process of claim 13 further characterized in that said compound is epoxidized by reaction with peracetic acid.

16. The process of claim 13 further characterized in that the epoxy-substituted saturated tetracyclic compound resulting from the epoxidizing step is reacted with potassium thiocyanate to form an epithia-substituted saturated tetracyclic compound.

References Cited in the file of this patent
UNITED STATES PATENTS

| | | |
|---|---|---|
| 2,655,514 | Kleiman | Oct. 13, 1953 |
| 2,676,131 | Soloway | Apr. 20, 1954 |